United States Patent
Popa et al.

(10) Patent No.: US 8,178,645 B2
(45) Date of Patent: May 15, 2012

(54) ROOM TEMPERATURE CURABLE POLYMERS AND PRECURSORS THEREOF

(75) Inventors: Paul J. Popa, Auburn, MI (US); Zenon Lysenko, Midland, MI (US); David A. Babb, Lake Jackson, TX (US); William A. Koonce, Pearland, TX (US); Gary E. Spilman, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 70 days.

(21) Appl. No.: 12/668,609

(22) PCT Filed: Jul. 10, 2008

(86) PCT No.: PCT/US2008/069634
§ 371 (c)(1),
(2), (4) Date: Jun. 10, 2010

(87) PCT Pub. No.: WO2009/009654
PCT Pub. Date: Jan. 15, 2009

(65) Prior Publication Data
US 2010/0249357 A1   Sep. 30, 2010

Related U.S. Application Data

(60) Provisional application No. 60/959,240, filed on Jul. 12, 2007.

(51) Int. Cl.
*C08G 18/42* (2006.01)
*C08G 63/00* (2006.01)
*C08G 18/71* (2006.01)

(52) U.S. Cl. ............... 528/69; 528/44; 528/26; 528/271

(58) Field of Classification Search ............. None
See application file for complete search history.

(56) References Cited

U.S. PATENT DOCUMENTS

| | | | |
|---|---|---|---|
| 2,332,849 A | 10/1943 | Gruber et al. | |
| 3,210,325 A * | 10/1965 | De Witt et al. | 526/250 |
| 3,227,735 A * | 1/1966 | De Witt et al. | 554/121 |
| 3,627,722 A | 12/1971 | Seiter | |
| 3,632,557 A | 1/1972 | Brode et al. | |
| 3,787,459 A | 1/1974 | Frankel et al. | |
| 3,979,344 A | 9/1976 | Bryant et al. | |
| 4,083,816 A | 4/1978 | Frankel et al. | |
| 4,216,343 A | 8/1980 | Rogier | |
| 4,216,344 A | 8/1980 | Rogier | |
| 4,222,925 A | 9/1980 | Bryant et al. | |
| 4,229,562 A | 10/1980 | Rogier | |
| 4,243,818 A | 1/1981 | Rogier | |
| 4,304,945 A * | 12/1981 | Rogier | 568/853 |
| 4,348,543 A | 9/1982 | Rogier | |
| 4,374,237 A | 2/1983 | Berger et al. | |
| 4,408,021 A | 10/1983 | Penn | |
| 4,423,162 A * | 12/1983 | Peerman et al. | 521/164 |
| 4,496,487 A * | 1/1985 | Peerman et al. | 554/213 |
| 4,543,369 A * | 9/1985 | Peerman et al. | 521/137 |
| 4,625,012 A | 11/1986 | Rizk et al. | |
| 4,633,021 A | 12/1986 | Hanes | |
| 4,731,486 A | 3/1988 | Abatjoglou et al. | |
| 4,742,087 A * | 5/1988 | Kluth et al. | 521/107 |
| 5,162,426 A | 11/1992 | Hazan et al. | |
| 5,364,955 A | 11/1994 | Zwiener et al. | |
| 5,990,257 A | 11/1999 | Johnston et al. | |
| 6,075,064 A * | 6/2000 | Muller et al. | 521/174 |
| 6,107,433 A * | 8/2000 | Petrovic et al. | 528/1 |
| 6,355,127 B1 | 3/2002 | Mahdi et al. | |
| 2005/0119436 A1 | 6/2005 | Ziche et al. | |
| 2006/0276609 A1* | 12/2006 | Lysenko et al. | 528/44 |
| 2006/0293400 A1* | 12/2006 | Wiltz, Jr. et al. | 521/172 |
| 2007/0055035 A1 | 3/2007 | Ludewig et al. | |
| 2008/0125569 A1* | 5/2008 | Wehmeyer et al. | 528/361 |

FOREIGN PATENT DOCUMENTS

| | | |
|---|---|---|
| DE | 19908978 A1 | 9/2000 |
| GB | 1043507 | 9/1966 |
| WO | WO-01/12581 A1 | 2/2001 |
| WO | WO-2004/096744 A2 | 11/2004 |
| WO | WO-2004/096882 A1 | 11/2004 |
| WO | WO-2004/096883 A1 | 11/2004 |
| WO | WO 2004096882 A1 * | 11/2004 |
| WO | WO 2004096883 A1 * | 11/2004 |
| WO | WO-2006/118995 A1 | 11/2006 |
| WO | WO-2009/009271 A2 | 1/2009 |

OTHER PUBLICATIONS

An Introduction to the Mechanical Properties of Solid Polymers by I.M. Ward and E. W. Hadley, p. 23-30, Wiley & Sons (1993).
UTECH Asia, Low Cost Polyols from Natural Oils, Paper 36, 1995, Colvin et al.

* cited by examiner

Primary Examiner — Robert S Loewe

(57) ABSTRACT

A polyester polyol, referred to hereinafter as a MHMS polyol comprises fatty acid based mer units wherein at least about 80 weight percent of the fatty acid based mer units are from methyl 9 (10) hydroxymethylstearate, or is prepared from an oil having fatty acids or fatty acid esters which are at least about 80 weight percent oleic acid or esters thereof and which has an average hydroxyl functionality of from 1.5 to 4. A reaction product, referred to herein after as MHMS alkoxysilane prepolymer, is produced from at least one such MHMS polyol and at least one isocyanate functional silane. This prepolymer is moisture cured to form a silylated MHMS polymer.

10 Claims, No Drawings

ROOM TEMPERATURE CURABLE POLYMERS AND PRECURSORS THEREOF

CROSS-REFERENCE TO RELATED APPLICATIONS

This application claims benefit of U.S. Provisional Patent Application Ser. No. 60/959,240, filed Jul. 12, 2007, entitled "Room Temperature Curable Polymers and Precursors Thereof" which is herein incorporated by reference.

BACKGROUND

This invention relates to making and using certain alkoxysilane functional polymers, particularly those formed using seed oils and derivatives thereof and certain polyester polyols especially suitable for making the alkoxysilane functional polymers.

U.S. Pat. Nos. 3,627,722; 3,632,557; 3,979,344; 4,222,925; 4,374,237; 5,364,955 disclose variations on forming room temperature curable compositions by reacting isocyanate functionality in polyurethanes with silicon compounds. Generally the resulting silane capped polymers have alkoxysilane groups for curing with moisture. Bulky functional groups on the silanes were sometimes used to avoid excessive crosslinking. In some of the teachings, long polyurethane chains were used to avoid excessive crosslinking. Long chain polyurethanes can have undesirably high viscosity. Some such systems had low to negligible residual isocyanate functionality for the silanes to react with and were, therefore, impractical.

U.S. Pat. No. 5,990,257 taught silane capping of a polyurethane formed with a stoichiometric excess of polyol such that there were residual hydroxyl groups for reaction with a isocyanate functional silane. The resulting capped polymer was room temperature curable.

However, it would be desirable to avoid the use of a polyisocyanate and formation of a polyurethane, to produce a room temperature curable composition without formation of a polyurethane prepolymer and to avoid the excessive crosslinking that would be expected from reaction of a conventional polyether polyol with isocyanate-functional silane.

Moisture-cured isocyanate or silane functional polyols are known in the sealant market. These polyols are mostly based on polyethers (ethylene oxide/propylene oxide polymers) derived from petroleum feedstocks. The polyols are linear well-defined, high molecular weight intermediates, which have easy processability into standard sealant formulations. However, these sealants are hydrophilic and, as such demonstrate moisture uptake, mold growth and easy dirt pick up. In addition, the volatility of petroleum feedstock pricing and availability severely impacts the margins and pricing for these sealants. It would be advantageous to find new potential polyols from alternative feedstocks not tied to the petroleum industry, and extremely advantaged if such feedstocks were derived from renewable resources, such as natural seed oils. Desirably, such polyols could be formulated into analogous sealants in replacing polyether polyols using the same curing additive chemistry. Independently, the resultant sealants and coatings would have comparable mechanical properties, such as tensile strength and elongation as compared with commercial sealants formed using polyether polyols. Also independently, it would be desirable for the polyol, coating or sealant to be less hydrophilic and, thus, more resistant to moisture, mold and dirt pickup than are polyether polyol sealants and coatings.

SUMMARY OF THE INVENTION

It has now been found that monomer mixtures of or high in methyl 9-(10)-hydroxymethylstearate are useful to make polymers having amorphous character, elastomeric properties and molecular weights above 1000 Daltons without formation of a polyurethane prepolymer. The polymers are based on renewable resources and are useful in making sealants and coatings using moisture curing like that used to make polyether polyol sealants and coatings. However, the new polymers are less hydrophilic than polyether polyols of the same molecular weight and functionality. The polymers are formed by reaction of the hydroxymethyl fatty acids with initiators to make amorphous high polymer. Use of a certain difunctional initiators can result in triblock polymers comprising two blocks of poly(methyl 9-(10)-hydroxymethylstearate) separated by a block supplied by the initiator. This block crystallinity advantageously has improved the modulus strength in a crosslinked application. The polymer is advantageously crosslinked to a thermoset, which is seed-oil based, using a renewable resource and surprisingly elastic.

The invention includes a polyester polyol, referred to hereinafter as a MHMS polyol which comprises fatty acid based mer units wherein at least about 80 weight percent of the fatty acid based mer units are from methyl 9 (10) hydroxymethylstearate, or is prepared from an oil having fatty acids or fatty acid esters which are at least about 80 weight percent oleic acid or esters thereof and which has an average hydroxyl functionality of from 1.5 to 4.

The invention additionally includes a reaction product, referred to herein after as MHMS alkoxysilane prepolymer, which is produced from at least one such MHMS polyol and at least one isocyanate functional silane.

The invention also includes a prepolymer formed by the moisture curing of the prepolymer to form a silylated MHMS polymer.

Moreover, the invention includes a process of preparing a MHMS polyol comprising (A) reacting a fatty acid ester wherein at least about 80 weight percent of the fatty acid esters are methyl 9 (10) hydroxymethylstearate, or are prepared from an oil having fatty acids or fatty acid esters which are at least about 80 weight percent oleic acid or esters thereof with an initiator having at least 2 reactive groups selected from primary hydroxyl groups, amine groups, terminal isocyanate groups, terminal carbonyl groups or a combination thereof.

The invention further includes a process of preparing at least one MHMS alkoxysilane prepolymer comprising steps of: (a) supplying at least one MHMS polyol; (b) supplying at least one isocyanate functional silane and (c) admixing the MHMS polyol and isocyanate functional silane or combination thereof, optionally in the presence of at least one catalyst to produce at least one MHMS alkoxysilane prepolymer.

The invention includes a process of preparing at least one silylated MHMS polymer comprising steps of: (a) supplying at least one MHMS alkoxysilane prepolymer; and (b) exposing it to moisture under conditions such that at least one silylated MHMS polymer is formed.

In another aspect the invention includes articles comprising the polyol, prepolymer, or polymer, which articles include elastomers, sealants, adhesives, coatings and the like.

DETAILED DESCRIPTION OF THE INVENTION

Definitions

As used herein the term "elastomeric" means having the property of obeying Hooke's law, for instance as explained in

*An Introduction to the Mechanical Properties of Solid Polymers* by I. M. Ward and E. W. Hadley, pages 23-30, Wiley & Sons (1993).

As used herein the term "elastomer" refers to a polymer having the property of being elastomeric.

As used herein, the term "elongation" means the amount (percentage, %) that the material can be stretched just before it breaks as measured according to the procedures of ASTM D412.

As used herein the term "tensile strength" means the force placed on the material divided by the cross sectional area as measured according to the procedures of ASTM D412.

As used herein the term "modulus strength" or Young's modulus refers to the stiffness of a given material as measured according to the procedures of ASTM D412.

As used herein the term "amorphous" is used to refer to a polymer with a substantial absence of crystallinity in the polymer. This is observed by lack of melting transition in DSC (Differential Scanning Calorimetry).

As used herein, the term "block crystallinity" refers to that crystallinity as measured by DSC which describes the enthalpy or the heat of fusion required to melt a crystalline material. Materials which have no crystallinity or order in their structure will exhibit no such transition.

As used herein, "polyol" refers to an organic molecule having an average of greater than 1.0 hydroxyl groups per molecule. It may also include other functionalities, that is, other types of functional groups.

As used herein the term "conventional polyether polyol" is a polyol formed from at least one alkylene oxide, preferably ethylene oxide, propylene oxide or a combination thereof, and not having a part of the molecule derived from a vegetable or animal oil, a polyol of the type commonly used in making polyurethane foams, particularly for the practice of this invention, viscoelastic polyurethane foams. A polyether polyol can be prepared by known methods such as by alkoxylation of suitable starter molecules. Such a method generally involves reacting an initiator such as, water, ethylene glycol, or propylene glycol, with an alkylene oxide in the presence of a catalyst. Ethylene oxide, propylene oxide, butylene oxide, or a combination of these oxides can be particularly useful for the alkoxylation reaction. A polyether polyol, for instance polyoxyethylene polyol can contain alkyl substituents. The process for producing polyether polyols can involve a heterogeneous feed of a mixture of alkylene oxides, a sequential feed of pure or nearly pure alkylene oxide polyols to produce a polyol with blocks of single components, or a polyol which is capped with, for example, ethylene oxide or propylene oxide. These types of polyols are all known and used in polyurethane chemistry.

The term "natural oil polyol" (hereinafter NOP) is used herein to refer to compounds having hydroxyl groups which compounds are isolated from, derived from or manufactured from natural oils, including animal and vegetable oils, preferably vegetable oils. Examples of vegetable and animal oils that may be used include, but are not limited to, soybean oil, safflower oil, linseed oil, corn oil, sunflower oil, olive oil, canola oil, sesame oil, cottonseed oil, palm oil, rapeseed oil, tung oil, fish oil, or a blend of any of these oils. Alternatively, any partially hydrogenated or epoxidized natural oil or genetically modified natural oil can be used to obtain the desired hydroxyl content. Examples of such oils include, but are not limited to, high oleic safflower oil, high oleic soybean oil, high oleic peanut oil, high oleic sunflower oil (such as NuSun sunflower oil), high oleic canola oil, and high erucic rapeseed oil (such as Crumbe oil). Natural oil polyols are well within the knowledge of those skilled in the art, for instance as disclosed in Colvin et al., UTECH Asia, *Low Cost Polyols from Natural Oils*, Paper 36, 1995 and "Renewable raw materials—an important basis for urethane chemistry:" *Urethane Technology*: vol. 14, No. 2, Apr./May 1997, Crain Communications 1997, WO 01/04225, WO 040/96882; WO 040/96883; U.S. Pat. Nos. 6,686,435, 6,433,121, 4,508,853, 6,107,403, US Pregrant publications 20060041157, and 20040242910.

The term "natural oil derived polyol" is used herein to refer to NOP compounds which are derived from natural oils. For instance, natural oils or isolates therefrom are reacted with compounds ranging from air or oxygen to organic compounds including amines and alcohols. Frequently, unsaturation in the natural oil is converted to hydroxyl groups or to a group which can subsequently be reacted with a compound that has hydroxyl groups such that a polyol is obtained. Such reactions are discussed in the references in the preceding paragraph.

The term "hydroxyl number" (OH#) indicates the concentration of hydroxyl moieties in a composition of polymers, particularly polyols. A hydroxyl number represents mg KOH/g of polyol. A hydroxyl number is determined by acetylation with pyridine and acetic anhydride in which the result is obtained as the difference between two titrations with KOH solution. A hydroxyl number may thus be defined as the weight of KOH in milligrams that will neutralize the acetic anhydride capable of combining by acetylation with 1 gram of a polyol. A higher hydroxyl number indicates a higher concentration of hydroxyl moieties within a composition. A description of how to determine the hydroxyl number for a composition is well-known in the art and can be found in texts, for example in Woods, G. *The ICI Polyurethanes Book*—2nd ed. (ICI Polyurethanes, Netherlands, 1990).

The term "primary hydroxyl group" means a hydroxyl group (—OH) on a carbon atom which has only one other carbon atom attached to it, (preferably which, in addition to the optional single carbon atom, has only hydrogen atoms attached thereto) (—CH$_2$—OH).

The term "carbinol group" refers to a primary hydroxyl group in a —CH$_2$—CH$_2$—OH configuration.

The term "functionality" particularly "polyol functionality" is used herein to refer to the number of hydroxyl groups in a polyol.

The term "fatty acid" is used herein to mean long-chain carboxylic acids, with chain length of at least 4 carbon atoms. Typical fatty acids have chain length of 4 to 18 carbon atoms, though some have longer chains. Linear, branched, or cyclic aliphatic groups may be attached to the long chain. Fatty acid residues may be saturated or unsaturated, and they may contain functional groups. Suitable fatty polyols include, for example, fatty acids, esters of fatty acids, amides of fatty acids, dimers, trimers, oligomers, or polymers thereof, and mixtures thereof, as long as the compound is a polyol. The hydroxyl functions of a suitable fatty polyol may reside on the fatty acid residue, on other parts of the molecule, or on both.

The term "unsaturated fatty acid" as used herein means a fatty acid having at least one carbon to carbon double bond. The unsaturated fatty acid comprises an extended carbon chain containing at least one carbon-carbon double bond and terminating in a carboxylic acid group. Typically, the unsaturated fatty acid will contain greater than about 6 carbon atoms, preferably, greater than about 10 carbon atoms, and more preferably, greater than about 12 carbon atoms. Typically, the unsaturated fatty acid will contain less than about 50 carbon atoms, preferably, less than about 36 carbon o atoms, and more preferably, less than about 26 carbon atoms. Non-limiting examples of unsaturated fatty acids that may be suitably employed in the fatty acid feedstock or the fatty acid segment of the ester feedstock include 3-hexenoic (hydrosorbic), trans-2-heptenoic, 2-octeloic, 2-nonenoic, cis- and trans-4-decenoic, 9 o decenoic (caproleic), undecenoic (undecylenic), trans-3-dodecenoic (linderic), tridecenoic, cis-9-tetradeceonic (myristoleic), pentadecenoic, cis-9-hexadecenoic (cis-9 palmitoelic), trans-9-hexadecenoic (trans-9-palmitoleic), 9-heptadecenoic, cs-6-I octadecenoic (petroselinic), trans-6-octadecenoic (petroselaidic), cis-9-octadecenoic (oleic), trans-9-octadecenoic (elaidic), cis-1 1-octadecenoic, trans-1 1-octadecenoic (vaccenic), cis-5-eicosenoic, cis-9-eicosenoic (godoleic), cis-1 1-docosenoic (cetoleic), cis-i3-docosenoic (erucic), trans-13-docosenoic (brassidic), cis-15-tetracosenoic (selacholeic), cis-17 hexacosenoic (ximenic), and cis-21-triacontenoic (lumequeic) acids, as well as 2,4 hexadienoic (sorbic), cis-9-cis-12-octadecadienoic (linoleic), cis-9-cis-12-cis-15 octadecatrienoic (linolenic), eleostearic, 12-hydroxy-cis-9-octadecenoic (ricinoleic), cis-5 o docosenoic, cis-5,1 3-docosadienoic and like acids. The most preferred unsaturated fatty acid is oleic acid, which contains a chain of eighteen carbon atoms with one double bond at the 9-carbon position.

By "ester" or "ester group" is meant a moiety formed from the reaction of a hydroxyl group with an organic acid or acid derivative, which moiety contains fatty acid and/or other organic radicals having at least 2 carbon atoms, typically at least 8 carbon atoms, more typically at least 12 carbon atoms, most typically at least 16 carbon atoms.

The term "cure" is used herein to mean conversion of the polymer from the liquid state to a coherent rubber-like solid or elastomer upon exposure to atmospheric moisture at temperatures not in excess of 30° C.

The term "room temperature curable," "room temperature vulcanizable" or RTV is used to denote curing without necessity of temperatures in excess of about 30° C.

This invention comprises certain polyols that comprise mer units based on methyl 9-(10)-hydroxymethylstearate (MHMS polyol) and the process of reacting at least one such MHMS polyol with at least one isocyanate functional silane as well as the reaction product thereof, referred to hereinafter as a MHMS alkoxysilane prepolymer, as well as the room temperature cured products of that MHMS alkoxysilane prepolymer and such products as sealants, adhesives and coatings formed therefrom.

Practice of the invention includes the reaction of a polyester polyol having a relatively high content of methyl 9 (10) hydroxymethylstearate (hereinafter MHMS polyol), that is a polyol comprising fatty acid based mer units wherein at least about 80 weight percent, preferably at least about 85, more preferably at least about 90, most preferably at least about 95 weight percent of the fatty acid based mer units are from methyl 9 (10) hydroxymethylstearate, with a silicon compound. The MHMS polyol is produced using methods well within the skill in the art. Methyl hydroxymethylstearate (CAS registry number 346706-54-5) is obtained by purchase, direct synthesis or synthesis from natural oils. Synthetic methods include those within the skill in the art and, for instance as disclosed in Behr, Arno; Fiene, Martin; Buss, Christian; Eilbracht, Peter, Hydroaminomethylation of fatty acids with primary and secondary amines—a new route to interesting surfactant substrates. *European Journal of Lipid Science and Technology* (2000), 102(7), 467-471; or DeWitt, Elmer J.; Ramp, Floyd L.; Backderf, Richard H. Hydroxymethylstearic acid polyester copolymers, U.S. Pat. No. 3,210, 325 (1965).

Alternatively, a natural oil that produces fatty acids including oleic acid on saponification, for instance using a base such as sodium hydroxide is saponified. Then the fatty acids are purified or refined by methods within the skill in the art such as wiped film evaporator, distillation apparatus, simulated moving bed (SMB), and the like or combinations thereof to obtain at least about 80 weight percent oleic acid, preferably at least about 85, more preferably at least about 90, most preferably at least about 95 weight percent oleic acid in the resulting purified oil.

Alkyl esters are then optionally formed from the resulting fatty acids by any effective process such as those known in the art to produce hydroxyalkylesters of the fatty acids. For example, the hydroxymethyl group may be introduced by a hydroformylation process using a cobalt or rhodium catalyst followed by the hydrogenation of the formyl group to obtain the hydroxymethyl group by catalytic or by chemical reduction. Procedures to form the hydroxymethylesters are described in U.S. Pat. Nos. 4,216,343; 4,216,344; 4,304,945 4,229,562, 4,083,816 and WO2004096744 all of which are incorporated herein by reference to the extent permitted by law. Other known processes to form hydroxymethylesters from fatty acids may also be used such as described by U.S. Pat. Nos. 2,332,849 and 3,787,459.

Alternatively, the fatty acid ester feedstock is obtained by transesterifying a seed oil that contains oleic acid or purified oleic acid with a lower alkanol. Transesterification produces the corresponding mixture of fatty acid esters of the lower alkanol. Advantageously, the lower alcohol has from 1 to about 15 carbon atoms. The carbon atoms in the alcohol segment are optionally arranged in a straight-chain or alternatively in a branched structure, and are optionally inertly substituted. Preferably, the alcohol is a straight-chain or a branched C1-8 alkanol, more preferably, a C1-4 alkanol. Even more preferably, the lower alkanol is selected from methanol, ethanol, and isopropanol. Most preferably, the lower alkanol is methanol.

Any known transesterification method can be suitably employed, provided that the ester products of the lower alkanol are achieved. The art adequately discloses transesterification (for example, methanolysis, ethanolysis) of seed oils; for example, refer to WO 2001/012581, DE 19908978, and BR 953081. Typically, in such processes, the lower alkanol is contacted with alkali metal, preferably sodium, at a temperature between about 30° C. and about 100° C. to prepare the corresponding metal alkoxide. Then, the seed oil is added to the alkoxide mixture, and the resulting reaction mixture is heated at a temperature between about 30° C. and about 100° C. until transesterification occurs.

Alternatively, the hydroxyalkyl ester of fatty acids from a seed oil having a lower than desired oleic acid ester content are produced and the resulting hydroxyalkyl fatty acid esters are purified by means within the skill in the art to contain the desired levels of oleic acid hydroxymethyl ester. Thus, purification or separation optionally occurs at any stage in the preparation of the polyol to be reacted with the silane. Such methods include that disclosed in copending application "PURIFICATION OF HYDROFORMYLATED AND HYDROGENATED FATTY ALKYL ESTER COMPOSITIONS" by George Frycek, Shawn Feist, Zenon Lysenko, Bruce Pynnonen and Tim Frank, filed Jun. 20, 2008, application number PCT/US 08/67585, which is incorporated by reference herein to the extent permitted by law. Alternatively, the polyol is prepared from reactions of purified chemicals, for instance the reaction of oleic acid with carbon monoxide via hydroformylation and subsequent hydrogenation to produce hydroxymethyl methylstearate followed by formation of the polyol.

Then aldehydes are optionally produced using methods within the skill in the art. It is preferred to employ non-aqueous hydroformylation processes that employ the operational features taught in U.S. Pat. Nos. 4,731,486 and 4,633,021, especially those taught in U.S. Pat. No. 4,731,486; the disclosures of said patents being incorporated herein by reference. Alternatively, unsaturated fatty acids or fatty acid esters are reacted with carbon monoxide and hydrogen in a non-aqueous reaction medium in the presence of a solubilized Group VIII transition metal-organophosphine metal salt ligand complex catalyst, and optionally solubilized free organophosphine metal salt ligand, under conditions sufficient to prepare the aldehyde composition described herein, for instance as taught in such references as WO2004096744 published Nov. 11, 2004, which is incorporated herein by reference to the extent permitted by law.

The conversion of aldehydes to alcohols is known in the art, and such methods within the skill in the art are advantageously applied to convert the aldehyde composition to the corresponding alcohol composition. Typically, the aldehyde composition comprising the formyl-substituted fatty acids or fatty acid esters is contacted with a source of hydrogen in the presence of a hydrogenation catalyst under hydrogenation process conditions sufficient to prepare the alcohol composition of hydroxymethyl-substituted fatty acids or fatty acid esters. Such methods are within the skill in the art for instance as disclosed in WO2004096744 published Nov. 11, 2004 which has been incorporated by reference herein to the extent permitted by law.

The alcohol composition disclosed herein is oligomerized or polymerized in the presence of an initiator to form a polyester polyol composition that is reactive with silicon compounds as described hereinafter. Representative process conditions for the alcohol polymerization and generalized description of the polyols derived therefrom is found in WO2004096882 published Nov. 11, 2004 which is incorporated herein by reference to the extent permitted by law.

Any compound reactive with methyl 9-(10)-hydroxymethyl stearate (MHMS) to form an oligomer, preferably a polyester oligomer, of methyl 9-(10)-hydroxymethyl stearate is suitably used as initiator. The most preferred initiator has two primary hydroxyl or amine groups, or two terminal isocyanate or carbonyl groups, from which linear chain growth can only occur in one direction (in a head-to-tail fashion) with an AB type monomer like MHMS.

Advantageous amine and hydroxyl initiators are depicted by the formula:

$$R(XH)_p$$

Where X is independently O, COO, NCO, N, or NH and p is 2 to 3. In the formula, each X is optionally the same or different. The initiator therefore encompasses polyols, polyamines, aminoalcohols, diisocyanates, dicarboxylic acids and compounds having combinations of such functional groups. R generally represents a linear, cyclic chain or combination thereof of alkane (C—C), alkene (C=O), ether (C—O—C) linkages or combinations thereof. The carbons within the aforementioned chain may be substituted with a methyl or ethyl group. Generally the molecular weight of the initiator is from about 32 to about 2000. Preferably, the molecular weight is at least about 50, more preferably at least about 60, most preferably at least about 90 to preferably at most about 1400, more preferably at most about 1200 and most preferably at most about 800.

Exemplary polyol initiators include neopentylglycol; 1,2-propylene glycol; trimethylolpropane; pentaerythritol; sorbitol; sucrose; glycerol; alkanediols such as 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol (36 carbon diol available from Henkel Corporation); hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and combinations thereof.

Any of the aforementioned where at least one of the alcohol groups present therein has been reacted with ethylene oxide or propylene oxide means the active hydrogen of the hydroxyl reacts to form a polyether polyol exemplified by the following formula:

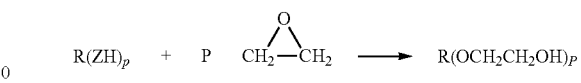

where R is the same as defined above. It is also understood that the other alkoxylating agents instead of ethylene oxide or propylene oxide are optionally used. Amine groups may also be reacted with the alkoxylating agent.

Exemplary polyamine initiators include ethylene diamine; neopentyldiamine, 1,6-diaminohexane; bisaminomethyltricyclodecane; bisaminocyclohexane; diethylene triamine; bis-3-aminopropyl methylamine; and triethylene tetramine.

Exemplary aminoalcohols include ethanolamine, diethanolamine, and triethanolamine.

Other useful initiators that may be used include polyols, polyamines or aminoalcohols described in U.S. Pat. Nos. 4,216,344; 4,243,818 and 4,348,543 and British Pat. No. 1,043,507.

Preferably, the initiator is selected from the group consisting of neopentylglycol; trimethylolpropane; pentaerythritol; sorbitol; sucrose; glycerol; 1,2-propylene glycol; 1,6-hexanediol; 2,5-hexanediol; 1,6-hexanediol; 1,4-cyclohexane diol; 1,4-butanediol; ethylene glycol; diethylene glycol; triethylene glycol; bis-3-aminopropyl methylamine; ethylene diamine; diethylene triamine; 9(1)-hydroxymethyloctadecanol; 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and combinations thereof.

More preferably the initiator is selected from the group consisting of neopentylglycol; 1,2-propylene glycol; trimethylolpropane; pentaerythritol; ethoxylated pentaerythritol; propoxylated pentaerythritol; sorbitol; sucrose; glycerol; ethoxylated glycerol; propoxylated glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol and combinations thereof.

Most preferably the initiator is an initiator which has inherent crystallinity, due to intermolecular and intramolecular interactions, molecular weight, preferred morphology at room temperature or a combination thereof. Such initiators include, but are not limited to poly(caprolactone), poly(pentadecalactone), poly(hydroxymethylundecylinic acid, poly(hexamethyladipamide), poly(oxytetramethylene), and other related diol, diacid, diamine, and polyisocyanate prepolymers. Such polyols are commercially available, for instance polycaprolactone polyols commercially available from The Dow Chemical Company under the trade designation Tone™ polyols, polyethylene glycol polyols commercially available from The Dow Chemical Company under the trade designation Carbowax, poly(tetrahydrofuran) polyols commercially available from Invista under the trade designation Terathane and the like and combinations thereof.

The monomer and the initiator are mixed or blended together by any suitable means such as those known in the art. For example, simple stirring is sufficient.

The methyl 9 (10) hydroxymethylstearate containing monomer and initiator are heated to a reaction temperature, for a reaction time, while under a vacuum and in the presence of an amount of a catalyst sufficient to form a methyl 9 (10) hydroxymethylstearate based polyol (MHMS polyol). The reaction temperature that is employed is, for example, a function of the methyl 9 (10) hydroxymethylstearate containing monomer, initiator and catalyst, but the reaction temperature is generally at least about 140° C. to about 300° C. when using a tin or titanium catalyst.

The catalyst is advantageously any suitable catalyst such as a tin, titanium, enzyme catalyst (for instance, lipase), carbonate catalyst (for instance, $K_2CO_3$, $NaHCO_3$) or combination thereof.

In a preferred embodiment, the catalyst is an enzyme catalyst, such as lipase, which allows the reaction temperature to be below about 100° C. to about room temperature. This in turn allows the use of initiators (for instance, sugar) that would be degraded by the higher temperatures using tin or titanium catalysts.

To form the MHMS polyol, the reaction is advantageously carried out under a vacuum.

The MHMS polyols advantageously have a number average molecular weight of at least about 5000, preferably at least about 7500, more preferably at least about 8500, most preferably at least about 10000 and at most about 35000, preferably at most about 25000, more preferably at most about 18000, most preferably at most about 15000 Daltons. Additional molecular weight is optionally built by reacting the MHMS polyols further with silicon-containing compounds as described hereinafter. Being initiated with difunctional initiators, these MHMS polyols have an average hydroxyl functionality of advantageously at least about 1.5, preferably at least about 2.0, and most preferably at least about 2.2, and preferably at most about 3, and most preferably at most about 2.8 hydroxyl groups per molecule.

Within these ranges, polyols of various hydroxyl functionality are more appropriate for specific end uses. For instance, harder end products like protective coatings result from polyols of higher functionality than those used for sealants which are optionally softer than coatings. Specific preferences are discussed under each application. Similarly, preferred polyol molecular weights vary with the end use.

The resulting MHMS polyols are elastomeric and are especially suitable for preparation of sealants as disclosed herein.

The MHMS polyols and especially the preferred improved polyester polyols described previously are reacted with silane compounds of the following structure:

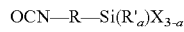

Wherein, R is a hydrocarbon group $C_1$-$C_{20}$, preferably $C_1$-$C_6$, more preferably $C_1$-$C_3$, and most preferably methylene.

a is 0 or 1, preferably a is 1.

R' is a monovalent hydrocarbon of advantageously $C_1$-$C_{20}$ advantageously alkyl (including methyl, ethyl, and the like), cycloalkyl groups (such as cyclohexyl and the like), or an aryl (such as phenyl and the like). Preferably R' is monovalent hydrocarbon group, more preferably an alkyl group, most preferably R is methyl.

Each X is independently a hydrolyzable group. Each hydrolyzable group is, independently, advantageously selected from a halogen atom (preferably Cl, or Br), a hydride group, an alkoxy group (preferably methoxyl or ethoxy), an acyloxy group, a ketoxime group, or the like or a combination thereof. Preferably each X is independently an alkoxy group, more preferably methoxy or ethoxy, and most preferably methoxy.

Examples of the silane include isocyanatopropyltrimethoxysilane, isocyanatopropyltriethoxysilane, (isocyanatopropyl)methyldimethoxysilane, (isocyanatopropyl)methyldiethoxysilane, (isocyanatomethyl)methydimethoxysilane, (isocyanatomethyl)methyldiethoxysilane, and the like or combinations thereof, preferably isocyanatopropyl trimethoxysilane, (isocyanatopropyl)methyldimethoxysilane, (isocyanatomethyl)methyldimethoxylsilane, more preferably (isocyanatopropyl)methyldimethoxysilane or (isocyanatomethyl)methyldimethoxysilane, most preferably (isocyanatomethyl)methyldimethoxysilane. Such reactions are within the skill in the art such as disclosed by U.S. Pat. No. 6,355,127 or U.S. Pat. No. 5,162,426.

Relative amounts of MHMS polyol and isocyanate functional silane for reaction are those amounts which result in the desired or predetermined extent of reaction. If too little silane is added the polymer may increase in viscosity due to reaction between the alkoxy groups on the silane and the hydroxyl groups on the polymer and then not have sufficient remaining alkoxysilane functionality to cure to the desired level; the polymer may prematurely gel upon storage or subsequently during formulating into a sealant, coating, or adhesive. Too much silane could negatively affect mechanical properties, specifically tensile strength and elongation at break, of the cured elastomer. Preferably a stoichiometric amount of silane is added to silylate all of the OH substituents on the MHMS polyol as calculated from the number average molecular weight (Mn) determined by gel permeation chromatography (GPC) and the OH number as previously disclosed. Preferably a stoichiometric ratio (NCO/OH) is at least about 0.85, more preferably at least about 0.9, most preferably at least about 0.95 and at most about 1.3, more preferably at most about 1.20, and most preferably at most about 1.05.

The reaction of the isocyanate functional silane and MHMS polyol takes place under reactions conditions, that is, any conditions under which the reaction is effective. The reaction of the isocyanate functional silane and MHMS polyol advantageously occurs at least about 0° C., preferably at least about 20° C., more preferably at least about 30° C., and most preferably at least about 40° C., preferably at most about 150° C., more preferably at most about 80° C., most preferably at most about 60° C.

Furthermore, reaction of the isocyanate functional silane and MHMS polyol can be facilitated by use of a polyurethane catalyst within the skill in the art such as those disclosed in U.S. Pat. No. 4,625,012. These include stannous salts of carboxylic acids, such as stannous octoate, stannous oleate, stannous acetate, stannous laurate, dialkyltin dicarboxylates such as dibutyltin dilaurate and dibutyltin diacetate. Preferably dibutyl tin dilaurate is used to facilitate the reaction of the silane and the hydroxyl functional polyester. If improved stability of the silylated polymer toward atmospheric moisture is needed, US2005/0119436 discloses the use of carboxylates of zinc or bismuth as an alternative catalyst. These include zinc acetylacetonate, zinc 2-ethylhexanoate, zinc neodeconate, bismuth 2-ethylhexanoate, and bismuth neodecanoate, preferably bismuth 2-ethylhexanoate, bismuth neodecanoate, zinc 2-ethylhexanoate, and zinc neodecanoate, or mixtures thereof.

The amount of catalyst used is advantageously at least about 0.001, preferably at least about 0.01, more preferably at least about 0.1, most preferably at least about 1 and at most about 5, more advantageously at most about 4, preferably at most about 3, more preferably at most about 2, most preferably at most about 1 weight percent based on the weight of the polymer/silane mixture.

The resulting MHMS alkoxysilane prepolymers are compounds of the invention. They are useful, among other things, to be reacted with one another to further lengthen the molecular chains for uses such as sealants, adhesives, and coatings, and combinations thereof.

When the compositions of this invention are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of this invention are bonded to form an infusible elastomeric material. To avoid premature curing, the compositions of the invention are preferably stored and maintained in the absence of moisture until cure is desired. Then, when cure is desired, the polymer is exposed to atmospheric moisture at a temperature not in excess of 30° C.

Furthermore, the reaction of curing of the MHMS alkoxysilane prepolymer can be facilitated by use of a silanol condensation catalyst or curing accelerator. Silanol condensation catalysts or accelerators are well known in the art such as those disclosed in U.S. Pat. No. 6,355,127 and include the following: titanic acid esters, such as tetrabutyl titanate, tetrapropyl titanate, and the like; organotin compounds, such as dibutyltin dilaurate, dibutyltin maleate, dibutyltin diacetate, tin octylate, tin naphthenate, reaction products of dibutyltin oxide and phthalic acid esters, dialkyltin diacetyl acetonates, such as dibutyltin bis(acetylacetonate); dialkyltinoxides, such as dibutyltinoxide; organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonoate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. These compounds are not limited; on can use any silanol condensation catalyst which is in general use. These silanol condensation catalysts may be used individually or in combinations. Such catalysts and accelerators include tetrabutyltitanate, dibutyltin dilaurate, dibutyltin bis(acetylacetonate), and the like, preferably dibutyltin dilaurate or dibutyltin bis(acetylacetonate), more preferably dibutyltin bis(acetylacetonate).

The catalyst is present in an amount that is advantageously at least about 0.1 percent by weight of the polymer, more advantageously at least about 0.5 percent by weight of the polymer, preferably at least about 1 percent by weight of the polymer, more preferably at least about 1.5 percent by weight of the polymer, most preferably at least about 2 percent by weight of the polymer and at most about 10 percent by weight of the polymer, more advantageously at most about 7.5 percent by weight of the polymer, preferably at most about 5 percent by weight of the polymer, more preferably at most about 4 percent by weight of the polymer, most preferably at most about 3.5 percent based on weight of the polymer. Such catalysts are preferably combined with the polymer by means within the skill in the art during the formulation of the sealant, coating, or adhesive.

The MHMS alkoxysilane prepolymers, especially those produced from the improved polyester polyols of the invention, are themselves compounds of the invention and with the catalysts are compositions of the invention. The resulting cured polymers, referred to hereinafter as silylated MHMS polymers are also compounds and compositions of the invention. Similarly, the invention includes the sealants, adhesives, and coatings and other end uses comprising these polymers or prepolymers. Preferred properties for the MHMS polyol, the MHMS alkoxysilane prepolymer, and the corresponding silylated MHMS polymer differ somewhat for each end use as do other components that are optionally present in compositions suitable for each.

Crosslinking or cure of the silylated MHMS polymer results in an elastic thermoset polymer. Tensile strength for sealants, coatings and adhesives as measured according to the procedures of ASTM D412, is preferably at least about 0.25 MPa, more preferably at least about 0.5 MPa, most preferably at least about 1.0 MPa and preferably at most about 15 MPa, more preferably at most about 13 MPa. For sealants and adhesives elongation as measured according to the procedures of ASTM D412, is preferably at least about 50 percent, more preferably at least about 100 percent, most preferably at least about 200 percent, and preferably at most about 1500 percent, more preferably at most about 1200 percent, most preferably at most about 1000 percent. For coatings, elongation as measured according to the procedures of ASTM D412, is preferably at least about 10 percent, more preferably at least about 25 percent, most preferably at least about 50 percent, and preferably at most about 500 percent, more preferably at most about 200 percent, most preferably at most about 100 percent.

For use in sealants and adhesives, the MHMS polyol preferably has an average hydroxyl functionality of preferably at least about 1.5, more preferably at least about 2, most preferably at least about 2.2 and preferably at most about 4, more preferably at most about 3, most preferably at most about 2.8. Independently, but preferably additionally, the MHMS polyol preferably has an molecular weight of preferably at least about 7500 more preferably at least about 8500, most preferably at least about 10000 and preferably at most about 30000, more preferably at most about 25000, most preferably at most about 17000.

For formulating sealant, coating, and adhesive compositions, the MHMS alkoxysilane prepolymers or polymers of the invention are combined with fillers and additives known in the prior art for use as elastomeric compositions. Addition of such materials, physical properties such as viscosity, flow rate, sag, and the like and mechanical properties such as modulus, elongation, hardness, and the like can be modified. However, to prevent premature hydrolysis of the moisture sensitive groups of the polymer, the filler should be thoroughly dried before admixing. Exemplary filler materials such as calcium carbonate, titanium dioxide, carbon black, clays, fumed silica, precipitated silica, magnesium carbonate, diatomaceous earth, talc, zinc oxide, ferric oxide, and the like. The fillers may be used singly or in combination. This list is not comprehensive and is given as illustrative. However, fillers such as calcium carbonate, titanium dioxide, zinc oxide, and carbon black are especially effective for improving properties such as elongation, tensile strength, and the like. Most preferred is calcium carbonate. Depending on the desired workability and properties of the cured material the preferred filler level is at least about 3, more preferably about 10 parts per 100 parts by weight of prepolymer and at most about 250, more preferably about 200 parts per 100 parts of prepolymer. In addition to fillers, additives such as plasticizers, moisture scavengers, adhesion promoters, antioxidants, ultraviolet stabilizers, and the like can also be used in the sealant compositions.

Additives such as plasticizers may be used in combination with the above fillers to modify the rheological properties to a desired level. Plasticizers may be used individually or in combination. Such materials should be free of water, inert to the hydrolyzable groups on the polymer, and compatible with the polymer. Suitable plasticizers are well known in the prior art and include phthalate acid esters, such as dioctyl phthalate, butyl benzyl phthalate, and the like; phosphoric acid esters, such as tri-cresyl phosphate; polyethers, polybutenes, and plasticizers based on epoxy compounds, such as epoxidized soybean oil, aliphatic esters, and chlorinated paraffin, and the like. The amount of plasticizers are preferably at least about 1, more preferably at least about 5, most preferably at least about 10 and preferably at most about 150, more preferably at most about 100, and most preferably at most about 75 parts by weight, based on 100 parts by weight of the silylated prepolymer.

For use in coatings, the MHMS polyol preferably has an average hydroxyl functionality of preferably at least about 1.5, more preferably at least about 2, most preferably at least about 2.5, and preferably at most about 4, more preferably at most about 3, most preferably at most about 2.8. Independently, but preferably additionally, the MHMS polyol preferably has an molecular weight of preferably at least about 1000, more preferably at least about 2500, most preferably at least about 5000 and preferably at most about 30000, more preferably at most about 25000, most preferably at most about 17000.

Coatings optionally contain additives within the skill in the art such as fillers, plasticizers and those used in sealants. In addition, coatings generally include at least one solvent. The solvent is optionally any aprotic solvent which will dissolve or disperse the MHMS polyol, prepolymer or polymer. The optional solvent is used to adjust viscosity to provide a formulation suitable for coating, preferably having a viscosity of from about 10 centipoise to about 10 poise. In many cases, a single solvent is used to solubilize the system. However, in other cases it is often desirable to use mixtures of solvents in order to effect the best solubilization, and in particular a combination of an aromatic solvent with an oxygenated solvent is preferred. Suitable aromatic solvents include toluene, xylene, ethylbenzene, tetralin, naphthalene, and solvents which are narrow cut aromatic solvents comprising C8 to C13 aromatics such as those marketed by Exxon Company U.S.A. under the trade designation Aromatic™ 100, Aromatic™ 150, and Aromatic™ 200. The oxygenated solvents should not be extremely polar such as to become incompatible with the aromatic solvents or the MHMS polyol. Suitable oxygenated solvents can be selected from the following classes: ketones, ethers, and ether-esters, or any mixture of these. Examples of suitable oxygenated solvents include propylene glycol monomethyl ether acetate, propylene glycol propyl ether acetate, ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, dibasic ester (a mixture of esters of dibasic acids marketed by DuPont), ethyl acetate, n-propyl acetate, isopropyl acetate, butyl acetate, isobutyl acetate, amyl acetate, isoamyl acetate, mixtures of hexyl acetates such as those sold by Exxon Chemical Company under the brand name Exxate 700, acetone, methyl ethyl ketone, methyl isobutyl ketone, methyl amyl ketone, methyl isoamyl ketone, methyl heptyl ketone, and isophorone. The list should not be considered as limiting, but rather as examples of solvents which are useful in the present invention. The type and concentration of solvents are generally selected to obtain formulation viscosities and evaporation rates suitable for the application and cure of the coatings. Typical solvent concentrations in the formulations range from 0 to about 75 percent by weight with a preferred range between about 5 and 50 percent by weight and a most preferred range between about 10 and 40 percent by weight solvent in the composition of solvent, prepolymer, polymer or combination thereof, fillers, additives and other components.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

EXAMPLES

The following polyester polyols are compounds of the invention and are used in the manufacture of silylated prepolymers and polymers of the invention.

Preparation of Hydroxymethyl Polyol Resin (NOP-1 Through NOP-5)

TABLE A

| Polymer ID | Mn | OH Functionality | % monol in monomer mix | monomer mix charge, g | initiator (difunctional) | initiator amount, g |
|---|---|---|---|---|---|---|
| NOP-1 | 1063 | 2.1 | 89.5 | 834 | 1,6-hexanediol | 73.9 |
| NOP-2 | 2743 | 2.7 | 89.5 | 750 | 1,6-hexanediol | 42 |
| NOP-3 | 5178 | 2 | 89.5 | 750 | 1,6-hexanediol | 8.5 |
| NOP-4 | 6600 | 2.8 | 95.7 | 400 | 1,6-hexanediol | 9 |
| NOP-5 | 8592 | 2.6 | 95.7 | 400 | 1,6-hexanediol | 4.5 |

In each instance a hydroxymethylated mixture of fatty acid esters is obtained from soybean oil as described in WO2004/096882 and is purified by the process described in copending application "PURIFICATION OF HYDROFORMYLATED AND HYDROGENATED FATTY ALKYL ESTER COMPOSITIONS" by George Frycek, Shawn Feist, Zenon Lysenko, Bruce Pynnonen and Tim Frank, filed Jun. 20, 2008, application number PCT/U.S.08/67585, which is incorporated by reference herein to the extent permitted by law, until the content of monol, which almost entirely methyl 9-(10)-hydroxymethylstearate, indicated in Table A is obtained. The initiator indicated in Table A is used in the amount indicated in Table A to react with a monomer mixture resulting from the purification. mono-hydroxy fatty acid methyl ester, along with a small amount of byproducts of the hydroformylation and reduction process is charged to a three-neck, round-bottom flask equipped with a mechanical stirrer, a condenser, a Dean-Stark trap, a nitrogen inlet, and a water condenser.

NOP-1—The reaction mixture is heated to 170° C. and 0.6 grams of dibutyltin dilaurate is added. The reaction is held at this temperature while (85 grams of methanol are collected over approximately 90 minutes. The Dean-Stark trap is removed, a vacuum (1 inch Hg) is applied, and the reaction flask is heated to 198° C. for several hours. The OH # and molecular weight are determined and listed in Table A.

NOP-2—The reaction mixture is heated to 150° C. and 1.1 grams of dibutyltin dilaurate is added. The reaction is heated to 195-200° C. while methanol is collected. After approximately 2 hours, 56.8 grams of methanol (81.1 percent theoretical) is collected. The reaction is cooled to room temperature. The Dean-Stark trap is removed, 1 gram of dibutyltin dilaurate is added and the reaction heated to 195° C. Full vacuum (<1 in Hg) is applied and the reaction held for several hours and then cooled. The OH # and molecular weight are determined to be that indicated in Table A.

NOP-3—The reaction mixture is heated to 144° C. and 1.1 grams of dibutyltin dilaurate is added. The reaction is heated to 203° C. while methanol is collected. After 55.1 grams of methanol (78 percent theoretical) are collected, vacuum is applied and held for several hours. Heating is discontinued and vacuum stopped. The reaction is then heated to 200° C., and 1 gram of dibutyltin dilaurate is added. Vacuum is applied and held for several hours. The OH # and molecular weight are determined and reported in Table A.

NOP-4—The reaction mixture is heated to 160° C. and 1.1 grams of dibutyltin dilaurate is added. The reaction is heated to 190-198° C. while methanol is collected. After 80 percent of the theoretical methanol is collected, the reaction is cooled to 110° C. and 1 gram of dibutyltin dilaurate is added. The reaction is heated to approximately 200° C., vacuum applied and the reaction is held for several hours. The OH # and molecular weight are determined and reported in Table A.

NOP-5—The reaction mixture is heated to approximately 200° C. and 1 gram of dibutyltin dilaurate is added. The reaction is held for several hours while methanol is collected. Vacuum is applied and the temperature held at 195° C. for several hours. The OH # and molecular weight are determined and reported in Table A.

Preparation of Hydroxymethyl Polyol Resin (NOP-6 Through NOP-21)

In each instance, the initiator indicated in Table B is used in the amount indicated in Table B is reacted with a monomer mixture resulting from purification as described for NOP-1 through NOP-5 to contain the amount of monol indicated in Table B with the same significance as indicated for Table A. The monomer mixture is charged to a three-neck, round-bottom flask equipped with a mechanical stirrer, a steam-jacketed with a partial condenser, a receiver flask, a nitrogen inlet, and a water condenser. The mixture is degassed under high vacuum (<0.5 mm Hg) (less than 50 kPa) and backfilled with inert atmosphere (dry nitrogen). The reaction temperature is gradually increased from 110-150° C. over a 45-minute period. Then the tin catalyst (dibutyltin dilaurate for NOP-6-14, 20, 21 and dibutyltin oxide for formation of NOP 15-19 polyols in Table B) is added in an amount of 1400-1500 ppm while maintaining the inert atmosphere. No differences in effect between dibutyltin oxide and dibutyltin dilaurate are observed. It is believed that amounts of catalyst from about 1000-2000 ppm, and quite possibly a larger range, would produce essentially the same result. The reaction is allowed to continue at 150-180° C. for 3 hours while the distillate begins collecting in the receiver flask. After the 3 hours, the temperature is ramped to 190° C. until the methanol appears to trail off completely, which is a period of 4-5 hours.

At the completion of visible methanol removal, high vacuum is applied slowly until an atmosphere of 0.5 mm or less is obtained. The high vacuum is maintained for no less than one hour at 190° C. to remove trace amounts of methanol. The finished polyol is finally cooled and poured from the flask at 100 120° C. The resulting polyol is then taken to the next step for formulation without further processing or dilution.

TABLE B

Examples NOP-6 through NOP-21 Compositions and conditions for preparation

| Polymer ID | Mn | OH Functionality* | % monol in monomer mix | monomer mix charge, g | initiator (difunctional) | initiator amount, g |
|---|---|---|---|---|---|---|
| NOP-6 | 10067 | 3.6 | 92.9 | 200 | 1,6-hexanediol | 2 |
| NOP-7 | 10972 | 2.6 | 97.2 | 191 | 1,6-hexanediol | 2 |
| NOP-8 | 16000 | 4.1 | 96.3 | 200 | 1,6-hexanediol | 2 |
| NOP-9 | 10700 | 1.5 | 96.3 | 200 | 1,6-hexanediol + methylstearate (5 g)‡ | 2 |
| NOP-10 | 12525 | 2.9 | 97.5 | 200 | poly(ethylene glycol) MW 600 | 11 |
| NOP-11 | 13037 | 2.5 | 97.5 | 200 | 1,6-hexanediol + methylstearate (2 g)‡ | 2 |
| NOP-12 | 10035 | 2.4 | 90.9 | 204 | polycaprolactone MW 3000 | 75 |
| NOP-13 | 9649 | 2.3 | 90.9 | 200 | poly(ethylene glycol) MW 600 | 11 |
| NOP-14 | 9805 | 2.9 | 90.9 | 200 | poly(pentadecalactone) MW 3000 | 75 |
| NOP-15 | 11627 | 2.6 | 96.1 | 200 | polycaprolactone MW 3000 | 75 |
| NOP-16 | 8017 | 2.4 | 97.5 | 130 | poly(hydroxymethylundecylenic acid) MW 4500 | 83.2 |
| NOP-17 | 9140 | 2.1 | 97.5 | 200 | polycaprolactone MW 550 | 10 |
| NOP-18 | 14700 | 2.7 | 97.5 | 200 | hexanediamine | 1.2 |
| NOP-19 | 6400 | 2.65 | 90.3 | 940 | 1,3 and 1,4-cyclohexanemethanol | 11 |

TABLE B-continued

Examples NOP-6 through NOP-21 Compositions and conditions for preparation

| Polymer ID | Mn | OH Functionality* | % monol in monomer mix | monomer mix charge, g | initiator (difunctional) | initiator amount, g |
|---|---|---|---|---|---|---|
| NOP-20 | 10065 | 2.6 | | 250 g | methylene diphenyl-4,4'-diisocyanate - extension† | 4.3 |
| NOP-21 | 16584 | 1.5 | 96.1 | 200 | methylene diphenyl-4,4'-diisocyanate - initiation† | 4.5 |

*In this table, OH functionality refers to the OH functionality of the mixture of the polyol and methanol that remains from the transesterification of the methyl esters during formation of the polyol; therefore, it does not represent the structure of the polyol alone. The listed OH functionality is used to calculate stoichiometry for reaction with silane because methanol reacts with the silane.
‡The indicated weight of methylstearate is added with the amount listed in the following column of difunctional initiator.
†"Extension" indicates that the hydroxyl-containing polymers are coupled or extended using diisocyanate. "Initiation" indicates that the formation of a polyol is initiated using the diisocyanate.

In addition to NOP-1 through NOP-21 the following materials are used in subsequent examples:

NCO-1 is isocyanatopropyl triethoxysilane commercially available from GE Advanced Materials, Silicones under the trade designation A-Link 25 silicone.

NCO-2 is isocyanatopropyl trimethoxysilane commercially available from GE Advanced Materials, Silicones under the trade designation A-Link 35 silicone.

NCO-3 is isocyanatomethyl methyldimethoxysilane commercially available from Wacker Silicones under the trade designation Geniosil XL-42 silane.

DBTDL is dibutyltindilaurate commercially available from Aldrich Chemical Company.

CCT-1 is a titanate catalyst commercially available from DuPont under the trade designation Tyzor™ TnBT titanate catalyst.

ADD-1 is a linear phthalate ester plasticizer, commercially available from BASF Corporation under the trade designation Palatinol 711P.

ADD-2 is an epoxidized soybean oil commercially available from The Dow Chemical Company under the trade designation FLEXOL EPO.

ADD-3 is vegetable oil (soybean oil) commercially available from a local grocery store.

ADD-4 is an alkyl ($C_{10}$) bisphenol A phosphate commercially available from Dover Chemical Corporation under the trade designation Doverphos 675

CaCO3 is calcium carbonate commercially available from Omya Inc. under the trade designation Omyacarb UF.

TiO2 is titanium dioxide commercially available from DuPont under the trade designation Ti Pure R900.

Carbon black is commercially available from Columbian Chemical Company under the trade designation Raven 790.

VTMS is vinyl trimethoxy silane commercially available from Dow Corning under the trade designation Z-6300.

DBTDAA is dibutyl tin diacetylacetonate commercially available from Aldrich Chemical Company.

The prepolymers and polymers of Examples 1-6 are prepared according to the following procedure:

Each NOP indicated in Table C is added to a glass container in the amount indicated in the table. The NCO indicated in Table C, in the amount indicated, is added and mixed with the NOP using a spatula. Catalyst (DBTDL) is added in the amount indicated in Table C and mixed using a spatula until it appears homogenous. Each resulting formulation is heated in an oven at 55° C. for at least 3 hours. After cooling to room temperature, infrared spectroscopy (IR) is used to check for a peak corresponding to isocyanate. The results are given in Table C. In Examples 1 and 2, the resulting prepolymer is split into two aluminum weighing dishes (a and b, about 3.5 g each) where, the amount of curing catalyst (CCT) indicated in Table C is added to one of the dishes (a) and mixed with a wooden stick. Then both dishes of prepolymer are allowed to cure at the temperature and humidity, and for the period indicated in Table C with the results shown. Although the amount of prepolymer is split, the full amount used is shown in Table C for parts (a) and (b) of each example or sample. In the other examples and comparative samples, the amount of prepolymer used for curing is indicated in the table. Tack or lack of tack is determined by touch with a nitrile gloved finger. Cure throughout is indicated where there is no tack on both sides (top and bottom) of the film.

TABLE C

Examples 1(a)-6

|  | EX 1 (a) | Ex 1 (b)* | EX 2 (a) | EX 2 (b)* | EX 3 | Ex 4 | EX 5 | EX 6 |
|---|---|---|---|---|---|---|---|---|
| NOP-1 (g) | 5.1 | 5.1 | 5.1 | 5.1 | | | | |
| NOP-2 (g) | | | | | 20 | | | |
| NOP-3 (g) | | | | | | 25 | | |
| NOP-4 (g) | | | | | | | 23.5 | |
| NOP-5 (g) | | | | | | | | 25.5 |
| NCO-1 (g) | 2 | 2 | | | | | | |
| NCO-2 (g) | | | 1.9 | 1.9 | 3.9 | 1.95 | 1.9 | 1.4 |
| DBTDL (drops) | 2 | 2 | 2 | 2 | 4 | 4 | 4 | 4 |
| CAT-1 (drops) | 3 | 0 | 3 | 0 | 3 | 3 | 4 | 4 |
| IR result | N | N | N | N | N | Y | N | N |
| 2nd reaction time (same temperature | | | | | | 2 | | |
| IR result | | | | | | N | | |

TABLE C-continued

Examples 1(a)-6

| | EX 1 (a) | Ex 1 (b)* | EX 2 (a) | EX 2 (b)* | EX 3 | Ex 4 | EX 5 | EX 6 |
|---|---|---|---|---|---|---|---|---|
| Amount to cure (g) | 3.5 | 3.5 | 3.5 | 3.5 | 5 | 5 | 5 | 5 |
| Cure Temp ° C. | 18-19 | 18-19 | 18-19 | 18-19 | 19 | 19 | 18 | 18 |
| Humidity % | 60-63 | 60-63 | 60-63 | 60-63 | 43 | 43 | 37 | 37 |
| $1^{st}$ Cure time (hours) | 2 | 2 | 1 | 1 | 1 | 1 | 1 | 1 |
| Result | tacky | tacky | Tack free | tacky | Tack free | Tack free | Tack free | Tack free |
| $2^{nd}$ cure time (total hours) | 19 | 19 | 19 | 19 | | | | |
| Result | tacky | tacky | Tack free | Tack free | | | | |
| $3^{rd}$ cure time (days) | 3 | 3 | 2 | 2 | 6 | 6 | 9 | 9 |
| Result | Cured through-out | tacky | Cured through-out | >80% cured through | Cured through-out | Cured through-out | Cured through-out | Cured through-out |

*Comparative Sample not an example of the invention.

Examples 2-6 cured thoroughly in relatively short periods of time. Example 1 (a) also cured and is an example of the invention. For most applications curing in several days is not preferred when used alone. Example 1 (a), however, shows that silane choices can be used to control the rate of cure. For instance, combinations of faster and slower silane derivatives can be used to achieve predetermined cure rates. Comparison of parts (a) and (b) of Examples 1 and 2, respectively, show that a curing catalyst is useful to cure some prepolymers of the invention, especially prepolymers formed using ethoxy silanes.

Examples 7-30 and Comparative Sample A

The prepolymers and polymers of Examples 7-30 and Comparative Sample A are prepared according to the following procedure:

The amount of NOP indicated in Table D is placed in a bottle. The indicated amount of NCO is added. The two are mixed by hand using a spatula until the resulting admixture appears homogeneous. The bottle is purged with nitrogen and sealed, then placed in an oven at 55° C. for at least 3 hours. Then the resulting prepolymers are tested for presence of an isocyanate peak as in Example 1.

Following testing, the amounts indicated in Table D of resulting prepolymer and ADD-1 are placed in a cup commercially available from FlackTek, Inc. under the trade designation Max 100 or Max 60 cup and mixed using a dual asymmetric centrifuge mixer commercially available from FlackTek, Inc. under the trade designation DAC 150 FVZ-K SpeedMixer™ for one minute at a speed of 2700 rpm (for Examples 7-14) or for 30 seconds at 2400 rpm (Examples 15-30) to complete a first mixing. This mixer works by placing a cup in a basket where a mixing arm spins at a high speed (up to 3500 rpm) in one direction while the basket rotates in the opposite direction—hence dual asymmetric centrifuge. The combination of forces in different planes enables very fast mixing. The indicated amounts of $CaCO_3$ and $TiO_2$ are premixed then add to the mixing cup and mixed by hand using a spatula until wet, then for twice as long at the same speed as the first mixing. The amount of VTMS indicated in Table D is mixed into the cup, first by hand then at the same speed and for the same time as the first mixing. Then the amount of DBTDAA indicated in Table D is mixed into the cup, first by hand then at the same speed and for the same time as the first mixing to form a sealant composition.

Films are cast from each sealant composition by hand with a spatula to produce films having a thickness between ⅛ and 1/16 inch (1.5-3.2 mm), with the exception of CS A which could not be formed into a film. The films are cured at 50 percent relative humidity for 7 days at approximately 22° C. Then tensile at break is measured according to the procedures of ASTM D412, and Elongation at break is measured according to the procedures of ASTM D412 using an instrument commercially available from Instron under the trade designation Instron™ Model 1122 at a strain rate of 1"/min (2.54 mm/sec). Results are in Tables D, E and F.

TABLE D

Examples 7-14 and Comparative Sample A

| | EX 7 | EX 8 | EX 9 | EX 10 | EX 11 | Ex 12 | EX 13 | EX 14 | CS A |
|---|---|---|---|---|---|---|---|---|---|
| NOP-6 (g) | 80 | 80 | | | | | | | |
| NOP-7 (g) | | | 29.4 | | | | | | |
| NOP-8 (g) | | | | 76.8 | | | | | |
| NOP-9 (g) | | | | | 30 | | | | |
| NOP-10 (g) | | | | | | 12.5 | | | |
| NOP-11 (g) | | | | | | | 12.5 | 12.5 | 12.5 |
| NCO-1 (g) | | | | | | | | | |
| NCO-2 (g) | 5.54 | | | | | | | | |
| NCO-3 (g) | | 4.34 | 1.05 | 3.1 | 0.72 | 0.45 | 0.39 | 0.46 | 0.31 |

TABLE D-continued

Examples 7-14 and Comparative Sample A

| | EX 7 | EX 8 | EX 9 | EX 10 | EX 11 | Ex 12 | EX 13 | EX 14 | CS A |
|---|---|---|---|---|---|---|---|---|---|
| Stoichiometric Ratio NCO/OH | 0.94 | 0.94 | 0.94 | 0.98 | 1.06 | 0.96 | 1.01 | 1.21 | 0.82 |
| DBTDL (drops) | 3 | 3 | 2 | 4 | 2 | 2 | 2 | 2 | 2 |
| IR result | N | N | N | N | N | N | N | N | N |
| parts of prepolymer by weight | 100 | 100 | 100 | 100 | 100 | 100 | 100 | 100 | 100 |
| ADD-1 parts per 100 parts prepolymer (php) | 55 | 55 | 55 | 55 | 55 | 55 | 55 | 55 | 55 |
| CaCO3 (php) | 120 | 120 | 120 | 120 | 120 | 120 | 120 | 120 | 120 |
| TiO2 (php) | 20 | 20 | 20 | 20 | 20 | 20 | 20 | 20 | 20 |
| VTMS (php) | 2.0 | 2.0 | 2.0 | 2.0 | 2.0 | 2.0 | 2.0 | 2.0 | 2.0 |
| DBTDAA (php) | 2.0 | 2.0 | 2.0 | 2.0 | 2.0 | 2.0 | 2.0 | 2.0 | 2.0 |
| Humidity % | 50 | 50 | 50 | 50 | 50 | 50 | 50 | 50 | 50 |
| Tensile at break MPa | 0.39 | 1.16 | 1.05 | 1.14 | 0.43 | 0.53 | 1 | 0.69 | gel |
| Elongation at break % | 18 | 49 | 101 | 107 | 226 | 198 | 115 | 242 | gel |

*CS not an example of the invention.

Comparative Sample A formed a gel after mixing with DBTDAA and could not be formed into a film. The gel formation shows the result of using an insufficient amount of the isocyanate functional silane to prevent premature gelation due to the reaction of residual hydroxy functionality and the alkoxy groups from the silane. Along with Comparative Sample A, Examples 13 and 14 further illustrate the silylation range. Otherwise Examples 7-30 show that NOP's prepared with different initiators and at different molecular weights and OH functionality with different levels of fillers can be prepared and cured. The mechanical properties of these materials can be tailored based on the desired application as a sealant, protective coating, or adhesive.

TABLE E

Examples 15-25

| | EX 15 | EX 16 | EX 17 | EX 18 | EX 19 | EX 20 | EX 21 | EX 22 | EX 23 | EX 24 | EX 25 |
|---|---|---|---|---|---|---|---|---|---|---|---|
| NOP-12 (g) | 11 | 11 | 12 | 12.41 | | | | | | | |
| NOP-13 (g) | | | | | 12.5 | | | | | | |
| NOP-14 (g) | | | | | | 12 | | | | | |
| NOP-15 (g) | | | | | | | | 12.02 | 12.01 | 12.01 | 12 |
| NOP-16 (g) | | | | | | | | | | | 12 |
| ADD-1 (g) | | | 3.41 | 3.11 | 1.65 | | | 2.49 | | | |
| ADD-2 (g) | | | | | | | | | 2.48 | | |
| ADD-3 (g) | | | | | | | | | | 2.49 | |
| NCO-3 (g) | 0.43 | 0.37 | 0.46 | 0.48 | 0.42 | 0.58 | 0.43 | 0.44 | 0.44 | 0.43 | 0.57 |
| Stoichiometric Ratio NCO/OH | 1.02 | 0.87 | 1.00 | 1.00 | 0.88 | 1.02 | 1.00 | 1.02 | 1.02 | 1.00 | 0.98 |
| DBTDL (drops) | 2 | 2 | 1 | 1 | 1 | 1 | 1 | 1 | 1 | 1 | 1 |
| IR result | N | N | N | N | N | N | N | N | N | N | N |
| Parts of prepolymer | 100 | 100 | 100 | 100 | 100 | 100 | 100 | 100 | 100 | 100 | 100 |
| ADD-1 parts per 100 parts prepolymer (php) | 55 | 55 | 27* | 24* | 13* | 27 | 20* | | 27 | | 27 |
| ADD-2 parts per 100 parts prepolymer (php) | | | | | | | | 20** | | | |
| ADD-3 parts per 100 parts prepolymer (php) | | | | | | | | | | 20*** | |

TABLE E-continued

Examples 15-25

|  | EX 15 | EX 16 | EX 17 | EX 18 | EX 19 | EX 20 | EX 21 | EX 22 | EX 23 | EX 24 | EX 25 |
|---|---|---|---|---|---|---|---|---|---|---|---|
| CaCO3 (php) | 120 | 120 | 120 | 96 | 139 | 120 | 128 | 128 | 120 | 127 | 120 |
| TiO2 (php) | 20 | 20 | 20 | 16 | 19 | 20 | 21 | 21 | 20 | 21 | 20 |
| VTMS (php) | 2.0 | 2.0 | 2.0 | 1.6 | 1.9 | 2.0 | 2.1 | 2.1 | 2.0 | 2.1 | 2.0 |
| DBTDAA (php) | 2.0 | 2.0 | 2.0 | 1.6 | 1.9 | 2.0 | 2.1 | 2.1 | 2.0 | 2.1 | 2.0 |
| Humidity % | 50 | 50 | 50 | 50 | 50 | 50 | 50 | 50 | 50 | 50 | 50 |
| Tensile at break MPa | 0.67 | 0.35 | 0.88 | 1.14 | 0.41 | 0.78 | 1.17 | 1.33 | 1.27 | 0.71 | 1.40 |
| Elongation at break % | 248 | 417 | 256 | 204 | 274 | 110 | 347 | 323 | 295 | 343 | 247 |

*ADD-1 is added during the silylation step prior to formulation
**ADD-2 is added during the silylation step prior to formulation
***ADD-3 is added during the silylation step prior to formulation

TABLE F

Examples 26-30

|  | EX 26 | EX 27 | EX 28 | EX 29 | EX 30 |
|---|---|---|---|---|---|
| NOP-17 (g) | 12 | | | | |
| NOP-18 (g) | | 12 | | | |
| NOP-20 (g) | | | 12 | | |
| NOP-19 (g) | | | | | 12 |
| NOP-21 (g) | | | | 12 | |
| NCO-3 (g) | 0.45 | 0.36 | 0.51 | 0.17 | 0.8 |
| Stoichiometric Ratio NCO/OH | 1.01 | 1.01 | 1.02 | 1.00 | 1.0 |
| DBTDL (drops) | 1 | 1 | 1 | 1 | 1 |
| IR result | N | N | N | N | N |
| Parts of prepolymer | 100 | 100 | 100 | 100 | 100 |
| ADD-1 parts per 100 parts prepolymer (php) | 27 | 27 | 55 | 55 | 55 |
| CaCO3 (php) | 120 | 120 | 120 | 120 | 120 |
| TiO2 (php) | 20 | 20 | 20 | 20 | 20 |
| VTMS (php) | 2 | 2 | 2 | 2 | 2 |
| DBTDAA (php) | 2 | 2 | 2 | 2 | 2 |
| Humidity % | 50 | 50 | 50 | 50 | 50 |
| Tensile at break MPa | 0.66 | 0.41 | 0.55 | Did not cure | 0.41 |
| Elongation at break % | 184 | 272 | 127 | Did not cure | 60 |

Examples 17-19, 21, 22, and 24 show that the plasticizer can be added during the siylylation process step. This is an advantage if the NOP has high viscosity which the plasticizer would lower and facilitate better mixing of the NOP and silane during the silylation process. Examples 22 and 24 also illustrate the use of different plasticizer chemistries relative to the other examples. The remaining examples show that MHMS polyols made using different initiators (polyethylen glycols, polycaprolactams, amines and the like) are useful in making silylated derivatives and polymers having desired properties for use in sealants, adhesives, and coatings. The polymer composition is different for each based on the different initiators.

Examples 31-33

Adhesives

Hydroxymethyl polyols NOP-22 and 23 are prepared by the procedure used for NOP-6 using 1500 ppm of dibutyltin oxide (DBTO) as catalyst and the materials noted in Table G. NOP-16 is used as previously prepared.

TABLE G

| Patent Polymer ID | Mn | OH Func | % monol in monomer mix | monomer mix charge, g | initiator (difunctional) | initiator amount, g |
|---|---|---|---|---|---|---|
| NOP-22 | 10000 | 2.0 | 90.40 | 440 | polycaprolactone MW 3000 | 160 |
| NOP-23 | 11400 | 2.4 | 90.40 | 202 | Poly(tetrahydrofuran) MW 2900 | 65 |

TABLE H

|  | EX 31 | EX 32 | EX 33 |
|---|---|---|---|
| NOP-22 (g) | 12 | 0 | 0 |
| NOP-16 (g) | 0 | 15 | –0 |
| NOP-23 (g) | 0 | –0 | 15 |
| NCO-3 (g) | 0.39 | 0.72 | 0.51 |
| Stoichiometric Ratio NCO/OH | 1 | 1 | 1 |
| DBTDL (drops) | 1 | 1 | 1 |
| IR result | N | N | N |
| Parts of prepolymer | 100 | 100 | 100 |
| ADD-1 parts per 100 parts prepolymer (php) | 77 | 50 | 50 |
| Carbon Black (php) | 77 | 77 | 77 |
| ADD-4 (php) | 1.8 | 1.5 | 1.5 |
| DBTDAA (php) | 1 | 1 | 1 |
| Humidity % | 50 | 50 | 50 |
| Tensile at break MPa | 1.8 | 2.2 | 2.1 |
| Elongation at break % | 275 | 187 | 192 |

To make prepolymers and polymers of Examples 31-33, the amount of NOP indicated in Table H is placed in a bottle. The indicated amount of NCO is added. The two are mixed by hand using a spatula until the resulting admixture appears homogeneous. The bottle is purged with nitrogen and sealed, then placed in an oven at 55° C. for at least 3 hours. Then the resulting prepolymers are tested for presence of an isocyanate peak as in Example 1.

Following testing, the amounts indicated in Table H of resulting prepolymer and ADD-1 are placed in a cup commercially available from FlackTek, Inc. under the trade designation Max 100 or Max 60 cup and mixed using a dual asymmetric centrifuge mixer commercially available from FlackTek, Inc. under the trade designation DAC 150 FVZ-K SpeedMixer™ for 30 seconds at a speed of 2500 rpm to complete a first mixing. The indicated amount of carbon black is then added to the mixing cup and mixed by hand using a spatula until wet, then mixed for 1 minute, 2 times at the same speed as the first mixing. The sides of the cup are scraped with a spatula and the formulation mixed for 30 seconds at the same speed as the first mixing. Then ADD-4 and the DBTDAA are added to the cup and mixed for 30 seconds at the same speed as the first mixing to form each resulting adhesive composition Examples 31-33 show that compositions of the invention can be useful in formulations similar to automotive glass bonding adhesives.

While the foregoing is directed to embodiments of the present invention, other and further embodiments of the invention may be devised without departing from the basic scope thereof, and the scope thereof is determined by the claims that follow.

Embodiments of the invention include the following:
1. A polyester polyol, referred to hereinafter as a MHMS polyol which comprises fatty acid based mer units wherein at least about 80 weight percent of the fatty acid based mer units are from methyl 9 (10) hydroxymethylstearate, or is prepared from an oil having fatty acids or fatty acid esters which are at least about 80 weight percent oleic acid or esters thereof and which has an average hydroxyl functionality of from 1.5 to 4.
2. A reaction product, referred to herein after as MHMS alkoxysilane prepolymer, of at least one MHMS polyol and at least one isocyanate functional silane.
3. A composition comprising at least one MHMS alkoxysilane prepolymer which is the reaction product of at least one MHMS polyol and at least one isocyanate functional silane.
4. A polymer, also referred to herein as a silylated MHMS polymer, which is the reaction product of a prepolymer of any of the preceding embodiments and water in any form such as moisture.
5. A composition comprising at least one silylated MHMS polymer which is a cured MHMS alkoxysilane prepolymer, that is, the reaction product of water with the reaction product of at least one MHMS polyol and at least one isocyanate functional silane.
6. A process of preparing a MHMS polyol comprising
   A) reacting a fatty acid ester wherein at least about 80 weight percent of the fatty acid esters are methyl 9 (10) hydroxymethylstearate, or are prepared from an oil having fatty acids or fatty acid esters which are at least about 80 weight percent oleic acid or esters thereof with an initiator having at least 2 reactive groups selected from primary hydroxyl groups, amine groups, terminal isocyanate groups, terminal carbonyl groups or a combination thereof.
7. A process of preparing at least one MHMS alkoxysilane prepolymer comprising steps of:
   (a) supplying at least one MHMS polyol;
   (b) supplying at least one isocyanate functional silane
   (c) admixing the MHMS polyol and isocyanate functional silane or combination thereof, optionally in the presence of at least one catalyst to produce at least one MHMS alkoxysilane prepolymer.
8. A process of preparing at least one silylated MHMS polymer comprising steps of:
   (a) supplying at least one MHMS alkoxysilane prepolymer; and
   (b) exposing it to moisture under conditions such that at least one silylated MHMS polymer is formed.
9. An article comprising the polyol, prepolymer, polymer or composition of any of the preceding embodiments, a composition or compound produced by the process of any of the preceding embodiments or a combination thereof.
10. The article of the preceding embodiment wherein the article is an elastomer, a sealant, an adhesive, a coating or a combination thereof.
11. A composition of any of the preceding embodiments which is a sealant, adhesive, coating or combination thereof.
12. A polyol, reaction product, prepolymer, polymer, composition, process, article, sealant, coating or adhesive of any of the preceding embodiments wherein the polymer is or has at least one of, preferably 2 of and more preferably 3, most preferably 4 of (a) is amorphous (b) is elastomeric, (c) has as an average molecular weight above 1000 Daltons, or (d) is less hydrophilic than polyether polyols of the same molecular weight.
13. A polyol, reaction product, prepolymer, polymer, composition, process, article, sealant, coating or adhesive of any of the preceding embodiments wherein the polyol comprises fatty acid based mer units wherein at least about any of 80, 85, 90, or 95 weight percent of the fatty acid based mer units are from methyl 9 (10) hydroxymethylstearate, or independently is prepared from an oil having fatty acids or fatty acid esters which are at least about any of 80, 85, 90, or 95 weight percent oleic acid.
14. A polyol, reaction product, prepolymer, polymer, composition, process, article, sealant, coating or adhesive of any of the preceding embodiments wherein hydroxyalkylesters of the fatty acids are formed from fatty acids, preferably hydroxymethylesters are formed using a hydroformylation process, more preferably using a cobalt or rhodium catalyst followed by the hydrogenation of the formyl group. 15. A polyol, reaction product, prepolymer, polymer, composition, process, article, sealant, coating or adhesive of any of the preceding embodiments wherein aldehydes are produced from the fatty acids or their esters, preferably using a non-aqueous hydroformylation process, independently preferably followed by conversion of the resulting aldehyde groups to alcohol groups, more preferably by hydrogenation.
16. A polyol, reaction product, prepolymer, polymer, composition, process, article, sealant, coating or adhesive of any of the preceding embodiments wherein the hydroxymethyl fatty acid esters are reacted with an initiator to form at lest one polyol.
17. A polyol, reaction product, prepolymer, polymer, composition, process, article, sealant, coating or adhesive of any of the preceding embodiments wherein the initiator has at least two, preferably 2 groups selected from primary hydroxyl groups, amine groups, terminal isocyanate groups, terminal carbonyl groups or a combination thereof.
18. A polyol, reaction product, prepolymer, polymer, composition, process, article, sealant, coating or adhesive of any of the preceding embodiments wherein the molecular weight of the initiator is from any of 32, 50, 60 or 90 preferably to at most about any of 2000, 1400, 1200 or 800.
19. A polyol, reaction product, prepolymer, polymer, composition, process, article, sealant, coating or adhesive of any of the preceding embodiments wherein the initiator is selected from neopentylglycol; 1,2-propylene glycol; trimethylolpropane; pentaerythritol; sorbitol; sucrose; glycerol; alkanediols such as 1,6-hexanediol; 2,5-hexanediol; 1,4-butanediol; 1,4-cyclohexane diol; ethylene glycol; diethylene glycol; triethylene glycol; 9(1)-hydroxymethyloctadecanol, 1,4-bishydroxymethylcyclohexane; 8,8-bis(hydroxymethyl)tricyclo[5,2,1,0$^{2,6}$] decene; Dimerol alcohol (36 carbon diol available from Henkel Corporation); hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and a combination thereof.
20. A polyol, reaction product, prepolymer, polymer, composition, process, article, sealant, coating or adhesive of any of the preceding embodiments wherein the initiator is selected from ethylene diamine; neopentyldiamine, 1,6-diaminohexane; bisaminomethyltricyclodecane; bisaminocyclohexane; diethylene triamine; bis-3-aminopropyl methylamine; triethylene tetramine, ethanolamine, diethanolamine, triethanolamine, and a combination thereof.
21. A polyol, reaction product, prepolymer, polymer, composition, process, article, sealant, coating or adhesive of any of the preceding embodiments wherein the initiator is selected from neopentylglycol; trimethylolpropane; pentaerythritol; sorbitol; sucrose; glycerol; 1,2-propylene glycol; 1,6-hexanediol; 2,5-hexanediol; 1,6-hexanediol; 1,4-cyclohexane diol; 1,4-butanediol; ethylene glycol; diethylene glycol; triethylene glycol; bis-3-aminopropyl methylamine; ethylene diamine; diethylene triamine; 9(1)-hydroxymethyloctadecanol; 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol; any of the aforementioned where at least one of the alcohol or amine groups present therein has been reacted with ethylene oxide, propylene oxide or mixture thereof; and a combination thereof.
22. A polyol, reaction product, prepolymer, polymer, composition, process, article, sealant, coating or adhesive of any of the preceding embodiments wherein the initiator is selected from neopentylglycol; 1,2-propylene glycol; trimethylolpropane; pentaerythritol; ethoxylated pentaerythritol; propoxylated pentaerythritol; sorbitol; sucrose; glycerol; ethoxylated glycerol; propoxylated glycerol; diethanolamine; alkanediols such as 1,6-hexanediol, 1,4-butanediol; 1,4-cyclohexane diol; 2,5-hexanediol; ethylene glycol; diethylene glycol, triethylene glycol; bis-3-aminopropyl methylamine; ethylene diamine; diethylene triamine; 9(1)-hydroxymethyloctadecanol, 1,4-bishydroxymethylcyclohexane; 8,8-bis(hydroxymethyl)tricyclo[5,2,1,0$^{2,6}$]decene; Dimerol alcohol; hydrogenated bisphenol; 9,9(10,10)-bishydroxymethyloctadecanol; 1,2,6-hexanetriol and a combination thereof.
23. A polyol, reaction product, prepolymer, polymer, composition, process, article, sealant, coating or adhesive of any of the preceding embodiments wherein the initiator is selected from poly(caprolactone), poly(pentadecalactone), poly(hydroxymethylundecylinic acid, poly(hexamethyladipamide), poly(oxytetramethylene), other related diol, diacid, diamine, and polyisocyanate prepolymers and combinations thereof, preferably poly(caprolactone), poly(pentadecalactone), poly(hydroxymethylundecylinic acid, poly(hexamethyladipamide), poly(oxytetramethylene) and combinations thereof, more preferably polycaprolactone polyols, polyethylene glycol polyols, poly(tetrahydrofuran) polyols and combinations thereof.
24. A polyol, reaction product, prepolymer, polymer, composition, process, article, sealant, coating or adhesive of any of the preceding embodiments wherein the MHMS polyols advantageously have a number average molecular weight of at least about any of 5000, 7500, 8500 10000 and preferably at most about any of 35000, 25000, 18000, 15000 Daltons.
25. A polyol, reaction product, prepolymer, polymer, composition, process, article, sealant, coating or adhesive of any of the preceding embodiments wherein the MHMS polyols have an average hydroxyl functionality of advantageously at least about any of 1.5, 2.0, or 2.2, and preferably at most about any of 4, 3, or 2.8 hydroxyl groups per molecule.
26. A polyol, reaction product, prepolymer, polymer, composition, process, article, sealant, coating or adhesive of any of the preceding embodiments wherein the MHMS polyols are elastomeric.
27. A polyol, reaction product, prepolymer, polymer, composition, process, article, sealant, coating or adhesive of any of the preceding embodiments wherein the MHMS polyols are reacted with silane compounds of the following structure:

$$OCN-R-Si(R'_a)X_{3-a}$$

A polyol, reaction product, prepolymer, polymer, composition, process, article, sealant, coating or adhesive of any of the preceding embodiments wherein, R is a hydrocarbon group $C_1$-$C_{20}$, preferably $C_1$-$C_6$, more preferably $C_1$-$C_3$, and most preferably methylene; a is 0 or 1, preferably a is 1; R' is a monovalent hydrocarbon of advantageously $C_1$-$C_{20}$ advantageously alkyl, cycloalkyl groups, or an aryl group; preferably R' is monovalent hydrocarbon group, more preferably an alkyl group, most preferably R is methyl; each X is independently a hydrolyzable group where each hydrolyzable group is, independently, advantageously selected from a halogen atom, a hydride group, an alkoxy group (preferably methoxyl or ethoxy), an acyloxy group, a ketoxime group, or a combination thereof; and preferably each X is independently an alkoxy group, more preferably methoxy or ethoxy, and most preferably methoxy.

28. A polyol, reaction product, prepolymer, polymer, composition, process, article, sealant, coating or adhesive of any of the preceding embodiments wherein the silane is selected from isocyanatopropyltrimethoxysilane, isocyanatopropyltriethoxysilane, (isocyanatopropyl)methyldimethoxysilane, (isocyanatopropyl)methyldiethoxysilane, (isocyanatomethyl)methydimethoxysilane, (isocyanatomethyl)methyldiethoxysilane, and the like or combinations thereof, preferably isocyanatopropyl trimethoxysilane, (isocyanatopropyl)methyldimethoxysilane, (isocyanatomethyl)methyldimethoxylsilane or combinations thereof, more preferably (isocyanatopropyl)methyldimethoxysilane or (isocyanatomethyl)methyldimethoxysilane or a combination thereof, most preferably (isocyanatomethyl)methyldimethoxysilane.

29. A polyol, reaction product, prepolymer, polymer, composition, process, article, sealant, coating or adhesive of any of the preceding embodiments wherein relative amounts of MHMS polyol and isocyanate functional silane is a ratio of NCO/OH which is at least about any of 0.85, 0.9, 0.95 to preferably at most about any of 1.3, 1.20, or 1.05.

30. A polyol, reaction product, prepolymer, polymer, composition, process, article, sealant, coating or adhesive of any of the preceding embodiments wherein the reaction of the isocyanate functional silane and MHMS polyol takes place under reactions conditions, preferably at least about any of 0° C., 20° C., 30° C., or 40° C., to preferably at most about any of 150° C., 80° C., or 60° C.

31. A polyol, reaction product, prepolymer, polymer, composition, process, article, sealant, coating or adhesive of any of the preceding embodiments wherein reaction of the isocyanate functional silane and MHMS polyol is facilitated by use of a polyurethane catalyst, preferably stannous salts of carboxylic acids, more preferably stannous octoate, stannous oleate, stannous acetate, stannous laurate, or a combination thereof; dialkyltin dicarboxylates, preferably dibutyltin dilaurate, dibutyltin diacetate or a combination thereof; carboxylates of zinc or bismuth, preferably zinc acetylacetonate, zinc 2-ethylhexanoate, zince neodeconate, bismuth 2-ethylhexanoate, and bismuth neodecanoate, preferably bismuth 2-ethylhexanoate, bismuth neodecanoate, zinc 2-ethylhexanoate, and zinc neodecanoate, or combinations thereof; or a combination of the types of catalyst.

32. A polyol, reaction product, prepolymer, polymer, composition, process, article, sealant, coating or adhesive of any of the preceding embodiments wherein the amount of catalyst used in the reaction of MHMS polyol and isocyanate functional silane is advantageously at least about any of 0.001, 0.01, 0.1, or 1 to preferably at most about any of 5, 4, 3, 2, or 1 weight percent based on the weight of the polymer/silane mixture.

33. A polyol, reaction product, prepolymer, polymer, composition, process, article, sealant, coating or adhesive of any of the preceding embodiments wherein the prepolymer or composition thereof is cured by exposure to moisture, preferably, the moisture from the atmosphere to form a polymer, more preferably at a temperature of at most 30° C.

34. A polyol, reaction product, prepolymer, polymer, composition, process, article, sealant, coating or adhesive of any of the preceding embodiments wherein curing of the MHMS alkoxysilane prepolymer is facilitated by use of a silanol condensation catalyst or curing accelerator, preferably a titanic acid ester, more preferably selected from tetrabutyl titanate, tetrapropyl titanate, and a combination thereof; an organotin compound, preferably dibutyltin dilaurate, dibutyltin maleate, dibutyltin diacetate, tin octylate, tin naphthenate, reaction products of dibutyltin oxide and phthalic acid esters, and a combination thereof; a dialkyltin diacetyl acetonate, preferably dibutyltin bis(acetylacetonate); a dialkyltinoxide, preferably dibutyltinoxide; an organoaluminum compound, preferably selected from aluminum trisacetylacetonate, aluminum trisethylacetonate, and a combination thereof; a reaction product of a bismuth salt and organic carboxylic acid, preferably selected from bismuth tris(2-ethylhexoate), bismuth tri(neodeconate), and a combination thereof; a chelate compound, preferably selected from zirconium tetracetylacetonoate, titanium tetracetylacetonate, and a combination thereof; an amine compound, preferably selected from butylamine, octylamine, dibutylamine, monethanolamine, diethanolamine, triethanolamine, diethylenetriamine, cyclohexylamine, benzylamine, and a combination thereof; or their salts with carboxylic acids, and combinations thereof as well as combinations of the types of catalyst.

35. A polyol, reaction product, prepolymer, polymer, composition, process, article, sealant, coating or adhesive of any of the preceding embodiments wherein curing of the MHMS alkoxysilane prepolymer is facilitated by use of a silanol condensation catalyst or curing accelerator, selected from tetrabutyltitanate, dibutyltin dilaurate, dibutyltin bis(acetylacetonate), and combinations thereof, preferably dibutyltin dilaurate or dibutyltin bis(acetylacetonate), or a combination thereof more preferably dibutyltin bis(acetylacetonate).

36. A polyol, reaction product, prepolymer, polymer, composition, process, article, sealant, coating or adhesive of any of the preceding embodiments wherein curing of the MHMS alkoxysilane prepolymer is facilitated by use of a silanol condensation catalyst or curing accelerator present in an amount of at least about any of 0.1, 0.5, 1, 1.5 or 2 percent by weight of the polymer and preferably at most about any of 10, 7.5, 5, 4, or 3.5 percent based on weight of the polymer.

37. A polyol, reaction product, prepolymer, polymer, composition, process, article, sealant, coating or adhesive of any of the preceding embodiments wherein the polymer resulting after moisture cure of the prepolymer has at least one, preferably 2 of the following:
    (a) a Tensile strength as measured according to the procedures of ASTM D412 of at least about any of 0.25 MPa, 0.5 MPa, 1.0 MPa and preferably at most about either 15 MPa, or 13 MPa;
    (b) an elongation as measured according to the procedures of ASTM D412 of at least about any of 50, 100, or 200, and to preferably at most about any of 1500, 1200, or 1000 percent (for use in a sealant or adhesive);
(c) an elongation as measured according to the procedures of ASTM D412 is preferably at least about any of 10, 25, 50, to preferably at most about any of 500, 200, or 100 percent (for use in a coating).
38. A polyol, reaction product, prepolymer, polymer, composition, process, article, sealant, coating or adhesive of any of the preceding embodiments wherein the MHMS polyol has an average hydroxyl functionality of preferably at least about any of 1.5, 2, 2.2 (for sealants and adhesives) or 2.5 (for coatings) and preferably to at most about any of 4, 3, or 2.8.
39. A polyol, reaction product, prepolymer, polymer, composition, process, article, sealant, coating or adhesive of any of the preceding embodiments wherein the MHMS polyol has an molecular weight of at least about any of 7500, 8500, or 10000 to preferably at most about any of 30000, 25000, or 17000 for sealants and adhesives.
40. A polyol, reaction product, prepolymer, polymer, composition, process, article, sealant, coating or adhesive of any of the preceding embodiments wherein the MHMS polyol has an molecular weight of at least about any of 1000, 2500, or 5000 to preferably at most about any of 30000, 25000, 17000.
41. A polyol, reaction product, prepolymer, polymer, composition, process, article, sealant, coating or adhesive of any of the preceding embodiments wherein the MHMS alkoxysilane prepolymer or polymer is combined with fillers, additives or combinations thereof, preferably including at least one filler selected from calcium carbonate, titanium dioxide, carbon black, clays, fumed silica, precipitated silica, magnesium carbonate, diatomaceous earth, talc, zinc oxide, ferric oxide, or combinations thereof, more preferably calcium carbonate, titanium dioxide, zinc oxide, and carbon black and combinations thereof, most preferably calcium carbonate or combinations therewith.
42. A polyol, reaction product, prepolymer, polymer, composition, process, article, sealant, coating or adhesive of any of the preceding embodiments wherein the MHMS alkoxysilane prepolymer or polymer is combined with filler at a concentration of at least about either 3 or 10 preferably to at most about-either 250 or 200 parts by weight per 100 parts of prepolymer or polymer.
43. A polyol, reaction product, prepolymer, polymer, composition, process, article, sealant, coating or adhesive of any of the preceding embodiments wherein the MHMS alkoxysilane prepolymer or polymer is combined with at least one additive, preferably selected from plasticizers, moisture scavengers, adhesion promoters, antioxidants, ultraviolet stabilizers, and combinations thereof.
44. A polyol, reaction product, prepolymer, polymer, composition, process, article, sealant, coating or adhesive of any of the preceding embodiments wherein the MHMS alkoxysilane prepolymer or polymer is combined with at least one plasticizer, preferably selected from phthalate acid esters, more preferably dioctyl phthalate, butyl benzyl phthalate or combinations thereof; phosphoric acid esters, more preferably tri-cresyl phosphate or combinations therewith; polyethers; polybutenes; plasticizers based on epoxy compounds, more preferably epoxidized soybean oil or combinations therewith; aliphatic esters, or chlorinated paraffins; and combinations thereof.
45. A polyol, reaction product, prepolymer, polymer, composition, process, article, sealant, coating or adhesive of any of the preceding embodiments wherein the MHMS alkoxysilane prepolymer or polymer is combined with at least one plasticizer A polyol, reaction product, prepolymer, polymer, composition, process, article, sealant, coating or adhesive of any of the preceding embodiments wherein the amount total amount of plasticizer or plasticizer combination is at least about any of 1, 5, or 10 preferably to at most about any of 150, 100, or 75 parts by weight per 100 parts by weight of the silylated prepolymer or polymer.
46. A polyol, reaction product, prepolymer, polymer, composition, process, article, sealant, coating or adhesive of any of the preceding embodiments wherein the MHMS alkoxysilane prepolymer or polymer is combined with at least one solvent, preferably at least one aprotic solvent which dissolves or disperses the prepolymer or polymer, independently preferably wherein a combination of solvents is used, more preferably A polyol, reaction product, prepolymer, polymer, composition, process, article, sealant, coating or adhesive of any of the preceding embodiments wherein the combination includes at least one aromatic solvent and at least one oxygenated solvent; most preferably wherein the aprotic solvent or aromatic solvent is selected from solvents which are narrow cut aromatic solvents comprising C8 to C13 aromatic compounds, toluene, xylene, ethylbenzene, tetralin, naphthalene, or combinations thereof and, independently, most preferably wherein the aprotic solvent or oxygenated solvent is selected from ketones, ethers, and ether-esters, or combinations thereof, advantageously from propylene glycol monomethyl ether acetate, propylene glycol propyl ether acetate, ethoxypropionate, dipropylene glycol monomethyl ether acetate, propylene glycol monomethyl ether, propylene glycol monopropyl ether, dipropylene glycol monomethyl ether, diethylene glycol monobutyl ether acetate, ethylene glycol monoethyl ether acetate, ethylene glycol monobutyl ether acetate, ethylene glycol monoethyl ether, ethylene glycol monobutyl ether, diethylene glycol monoethyl ether, diethylene glycol monoethyl ether acetate, mixtures of esters of dibasic acids, ethyl acetate, n-propyl acetate, isopropyl acetate, butyl acetate, isobutyl acetate, amyl acetate, isoamyl acetate, mixtures of hexyl acetates, acetone, methyl ethyl ketone, methyl isobutyl ketone, methyl amyl ketone, methyl isoamyl ketone, methyl heptyl ketone, isophorone and combinations thereof
47. A polyol, reaction product, prepolymer, polymer, composition, process, article, sealant, coating or adhesive of any of the preceding embodiments wherein the MHMS alkoxysilane prepolymer or polymer is combined with at least one solvent in an amount sufficient to produce a composition having a viscosity of from about 10 centipoise to about 10 poise.
48. A polyol, reaction product, prepolymer, polymer, composition, process, article, sealant, coating or adhesive of any of the preceding embodiments wherein the MHMS alkoxysilane prepolymer or polymer is combined with at least one solvent in a concentration of at least about any of 0, 1, 5, or 10 preferably to at most about any of 75, 50 or 40 weight percent solvent in the composition of polymer or prepolymer optionally containing solvent.

The invention claimed is:

1. A prepolymer comprising the reaction product of at least one isocyanate functional silane and a polyester polyol having an average hydroxyl functionality of from 1.5 to 4, wherein the polyester polyol is selected from the group consisting of
    a polyester polyol, referred to hereinafter as a MHMS polyol, which is comprised of fatty acid based repeat units wherein at least about 80 weight percent of the fatty acid based repeat units are from methyl 9 (10) hydroxymethylstearate, and
    a polyester polyol, which is comprised of fatty acids or fatty acid esters, wherein at least about 80 weight percent of the fatty acids or fatty acid esters are derived from oleic acid or esters thereof.

2. A polymer, which is the reaction product of the prepolymer of claim 1 and water.

3. The polymer of claim 2 having at least one of the following:
    (a) a Tensile strength as measured according to the procedures of ASTM D412 of at least about 0.25 MPa; or
    (b) an elongation as measured according to the procedures of ASTM D412 of at least about 10 percent.

4. An article comprising the polymer of claim 3, wherein the article is an elastomer, a sealant, an adhesive, a coating or a combination thereof.

5. An article comprising the polymer of claim 2, wherein the article is an elastomer, a sealant, an adhesive, a coating or a combination thereof.

6. An article comprising the prepolymer of claim 1, wherein the article is an elastomer, a sealant, an adhesive, a coating or a combination thereof.

7. A process of preparing at least one prepolymer comprising steps of:
    (a) supplying at least one polyol made by
        reacting a fatty acid ester wherein at least about 80 weight % of the fatty acid esters are derived from 9 (10) hydroxymethylstearate with an initiator having at least 2 reactive groups selected from primary hydroxyl groups, amine groups, terminal isocyanate groups, terminal carbonyl groups or a combination thereof, or by
        reacting an oil having fatty acids or fatty acid esters wherein at least 80 weight % of the fatty acids or fatty acid esters are derived from oleic acid or esters thereof with an initiator having at least 2 reactive groups selected from primary hydroxyl groups, amine groups, terminal isocyanate groups, terminal carbonyl groups or a combination thereof;
    (b) supplying at least one isocyanate functional silane; and
    (c) admixing the MHMS polyol and isocyanate functional silane or combination thereof, optionally in the presence of at least one catalyst to produce at least one MHMS alkoxysilane prepolymer.

8. A process of preparing at least one silylated polymer comprising steps of:
    (a) supplying at least one prepolymer of claim 7; and
    (b) exposing it to moisture under conditions such that at least one silylated polymer is formed.

9. An article comprising the polymer produced by the process of claim 8, wherein the article is an elastomer, a sealant, an adhesive, a coating or a combination thereof.

10. An article comprising the prepolymer produced by the process of claim 7, wherein the article is an elastomer, a sealant, an adhesive, a coating or a combination thereof.

* * * * *